United States Patent Office 3,306,136
Patented Feb. 28, 1967

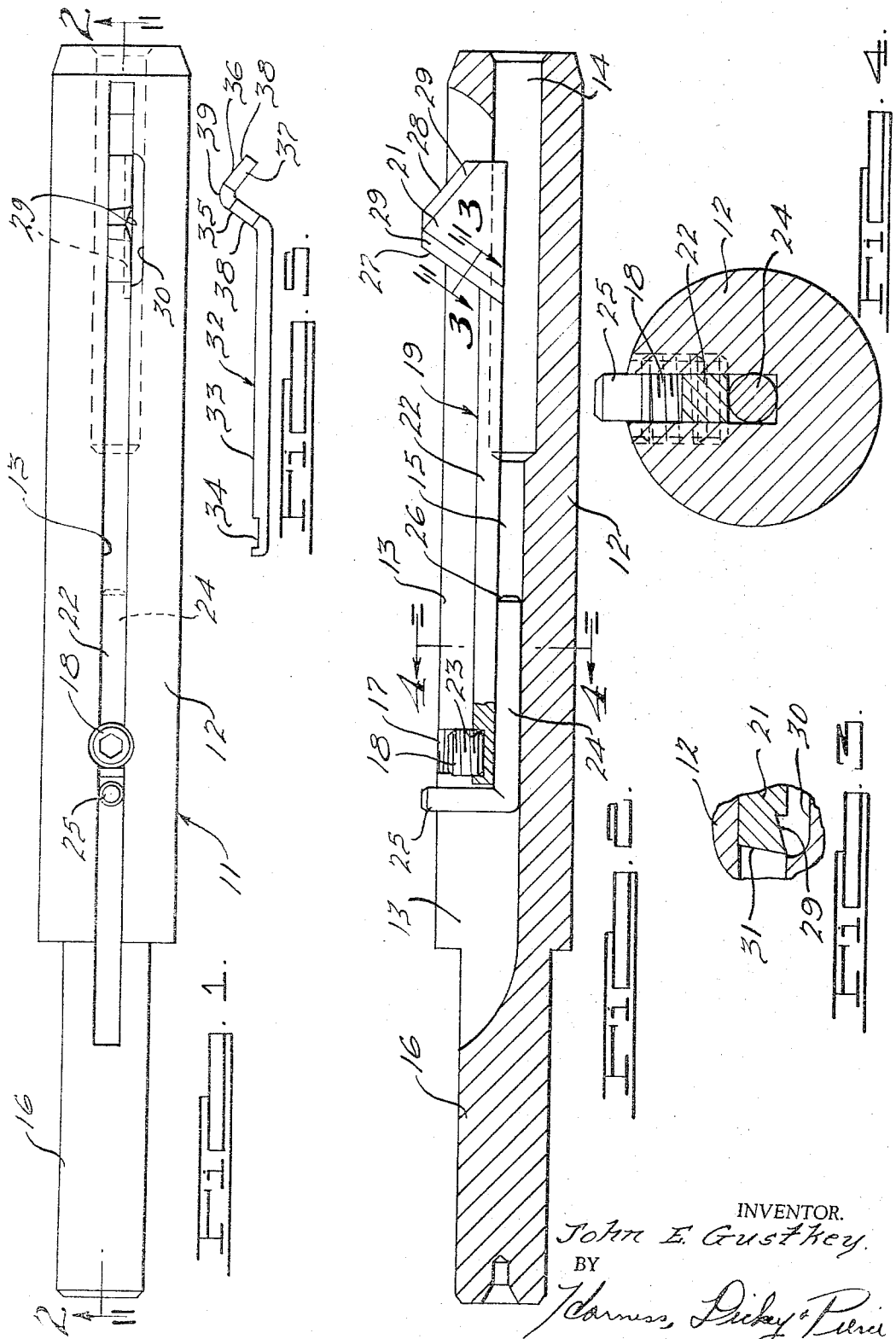

---

3,306,136
DEBURRING TOOL
John E. Gustkey, Detroit, Mich., assignor to
Cogsdill Tool Products, Inc.
Filed July 21, 1965, Ser. No. 473,640
11 Claims. (Cl. 77—58)

This invention relates to deburring tools, and particularly to a tool for removing burrs at the end of an aperture in a workpiece.

The tool of the present invention has a cutting end with an elongated spring extension which permits the cutting end to deflect. A fulcrum is provided beneath the spring extension which is adjustable toward or away from the cutting end to change the position of the fulcrum point over which the spring extension deflects. The body is cylindrical and provided with a driving shank of the same or different diameter and a slot is provided on the diameter which intersects an aperture at the center of the tool body. The aperture is enlarged in the forward or cutting blade end so that chips can fall therefrom and from the slot adjacent to the cutting end of the tool. A threaded aperture spanning the slot contains a set screw which extends within a notch at the end of the spring extension of the tool which clamps the end against a rod within the aperture. The rod is adjustable along the slot to form the fulcrum point for the spring extension of the tool. It is within the purview of the invention to form the cutting blade and the spring extension from a spring wire which has the notch in one end and is formed in V-shape at the other end, the arms of the V being ground to the diameter to provide cutting edges.

Accordingly, the main objects of the invention are to provide a tool for removing the burrs at the edge of an aperture having a cylindrical body with a diametrical slot which communicates with a central aperture from which a cutting blade projects when urged outwardly by a spring extension which deflects over a fulcrum point adjustably positioned in the slot; to provide a diametrical slot in a cylindrical body of a duburring tool with a tool having a cutting blade and a spring extending portion containing a notch which receives a set screw which secures the extension against an adjustable element with the slot; to provide a deburring tool having a diametrical slot communicating with a central aperture with a wire tool having a notch at one end by which it is clamped against an adjustable rod in the slot with the opposite end shaped in the form of a V, the arms of which are provided with cutting edges, and in general, to provide a tool for removing burrs at the edge of apertures which is simple in construction, positive in operation and economical of manufacture.

Other objects and features of novelty of the invention will be specifically pointed out or will become apparent when referring, for a better understanding of the invention, to the following description taken in conjunction with the accompanying drawing, wherein:

FIGURE 1 is a plan view of a tool for removing burrs at the end of an aperture which embodies features of the present invention;

FIG. 2 is a sectional view of the tool illustrated in FIG. 1, taken on the line 2—2 thereof;

FIG. 3 is an enlarged broken sectional view of the tool illustrated in FIG. 2, taken on the line 3—3 thereof;

FIG. 4 is an enlarged sectional view of the structure illustrated in FIG. 2, taken on the line 4—4 thereof, and FIG. 5 is a view of a cutting blade showing another form thereof.

The tool 11 for removing burrs from the end of an aperture of a workpiece has a cylindrical body 12 containing a diametrically disposed slot 13 which communicates with aligned apertures 14 and 15 on the axis of the body. A driving shank 16 is provided on one end of the body by which the tool is driven in rotation and advanced through and retracted from the aperture. It is to be understood that the shank end may be of any diameter and is herein illustrated as being smaller than the diameter of the body 12. A threaded aperture 17 spans the slot 13 and has a set screw 18 threaded therein.

A cutting tool 19 has a cutting end 21 and an extension 22 made of spring material with the end of the extension remote from the cutting end 21 provided with a notch 23 cut therein on the side from which the cutting end extends. An adjustable supporting rod 24 is disposed within the aperture 15 beneath the extension 22 and set screw 18, the tool and rod being clamped tightly together against the wall of the aperture 15 when the screw 18 is tightened thereon. This positions the cutting end beyond the outer surface of the body 12 from which it may deflect within the body after removing the burr to permit the body and the cutting end to pass through the aperture. The rod 24 has a right angle portion 25 which extends outwardly of the slot 13 for adjustment longitudinally of the slot. It will be noted in FIG. 2 that the end 26 of the rod 24 forms a fulcrum point on which the extension 22 rests and from which it deflects downwardly. If it was found that too much force was required to deflect the cutting end 21 within the slot 13, the screw 18 may be loosened and the rod 24 moved rearwardly in the aperture 15 by sliding the end 25 toward the shank end 16 of the body. This moves the end 26 rearwardly away from the cutting edge so that, after the extension and rod are again clamped to the body by the tightening of the screw 18, the bending movement of the extension 22 is reduced and less force will be required to deflect the cutting end 21 within the slot 13.

The cutting end has angularly disposed cutting edges 27 and 28 which are relieved at the front by the angular recess 29 so that sharp cutting edges are presented to the burr to be removed. Similarly, the top of the cutting edges 27 and 28 are sloped rearwardly, as illustrated at 31 in FIG. 3, to provide a relief thereto. The sloping edges 27 and 28 form cam surfaces which deflect the cutting end as the tool is advanced to move the end within the tool body. It will be noted that the cutting edge 28 is of greater slope than the cutting edge 27 and will produce a lighter cut than the edge 27 of less slope. The latter will require a greater force for deflecting the extension and moving the cutting end within the body. It will be noted that the aperture 14 is of substantially larger diameter than the aperture 15 and that the slot 13 has been cut away at 30 adjacent the cutting face of the cutting end 21 to permit the chips which fall within the slot 13 to pass from the aperture 14 and the bottom of the tool.

In FIG. 5 a further form of cutting tool 32 is illustrated, which is made from spring wire of cylindrical shape. The tool has an extension 33 provided with a notch 34 at one end which is similar to the notch 23 in the extension 22 of the cutting tool 19 above referred to. The opposite end of the extension 33 is bent into V-shape having arms 35 and 36 disposed in angular relation to each other. The faces 37 of the arms are ground to the diameter, to provide cutting edges 38 which are relieved by the arcuate portion therebelow. The arcuate portion 39 therebetween the arms assist in the deflection of the V-shaped end and the passage of the end through the aperture of the workpiece. The cutting tool 32 is supported within the slot 13 and apertures 14 and 15 of the body when secured upon the rod 24 by the set screw 18 so as to function in the same manner as the cutting tool 19 described hereinabove.

What is claimed is:

1. In a deburring tool having a cylindrical body with a diametrically disposed slot, a cutting tool in said slot having a cutting end and a spring extension, raised means within said slot at one end thereof, and a screw on the diameter of the body in the area of the slot above said means for engaging the spring end and securing it in fixed relation within the slot on said means.

2. In a deburring tool, a cylindrical body having a diametrical slot, a cutting tool having a cutting end and a spring extension, a rod in the bottom of the slot, and a screw in the area of the slot for clamping the spring end and rod against the bottom of the slot.

3. In a deburring tool, a body having a longitudinal slot therein, a cutting tool having a cutting end and a spring extension, raised means within said slot at one end thereof, and a set screw in the area of the slot above said means for securing the end of the spring extension opposite from that having the cutting end in fixed relation in the slot on said means.

4. In a cutting tool, an elongated body having a longitudinal extending slot, a cutting tool within the slot having a cutting end and a spring extension, a rod adjustable longitudinally in the bottom of the slot, and a set screw for securing the end of the spring extension opposite to that having the cutting end against the rod in the bottom of the slot.

5. In a cutting tool, an elongated body having a longitudinal extending slot, a cutting tool within the slot having a cutting end and a spring extension, a rod adjustable longitudinally in the bottom of the slot, and a set screw for securing the end of the spring extension opposite to that having the cutting end against the rod in the bottom of the slot, the adjustment of the rod along the bottom of the slot changing the bending moment of the spring extension.

6. In a deburring tool, a cylindrical body having a shank at one end and a diametrically disposed slot which communicates with an aperture on the centerline of the body, a cutting tool within the slot having a cutting end at one end which extends outwardly of the slot and a spring extension containing a notch at the opposite to the cutting end, a rod within the aperture, and a threaded screw in the area of the slot engaging the notch in the spring extension which is clamped against the rod where the screw is tightened.

7. In a deburring tool, a cylindrical body having a shank at one end and a diametrically disposed slot which communicates with an aperture on the centerline of the body, a cutting tool within the slot having a cutting end at one which extends outwardly of the slot and a spring extension containing a notch at the opposite to the cutting end, a rod within the aperture, and a threaded screw in the area of the slot engaging the notch in the spring extension which is clamped against the rod where the screw is tightened, said rod being adjustable within the aperture to change the bending moment of the spring extension.

8. In a deburring tool, a cylindrical body having a shank at one end and a diametrically disposed slot which communicates with an aperture on the centerline of the body, a cutting tool within the slot having a cutting end at one end which extends outwardly of the slot and a spring extension containing a notch at the opposite to the cutting end, a rod within the aperture, and a threaded screw in the area of the slot engaging the notch in the spring extension which is clamped against the rod where the screw is tightened, said central aperture being enlarged at the cutting end of the body to provide clearance for the chips cut by the cutting end.

9. In a deburring tool, a cylindrical body having a diametrical slot, a cutting tool in said slot having a cutting end and a spring extension, containing a notch, an L-shaped rod having one leg in the bottom of the slot beneath the notched end of the spring extension, and a screw set in the area of the slot for engaging the notch and securing the spring extension and rod in the bottom of the slot.

10. In a deburring tool, a cylindrical body having a diametrical slot, a cutting tool in said slot having a cutting end and a spring extension containing a notch, an L-shaped rod having one leg in the bottom of the slot beneath the notched end of the spring extension, and a set screw in the area of the slot for engaging the notch and securing the spring extension and the rod in the bottom of the slot, the other leg of the rod extending from the slot leg which the rod is adjusted along the bottom of the slot to change the bending moment of the spring extension.

11. In a deburring tool, a cylindrical body having a diametrical slot, a cutting tool in said slot having a cutting end and a spring extension containing a notch, an L-shaped rod having one leg in the bottom of the slot beneath the notched end of the spring extension, and a set screw in the area of the slot for engaging the notch and securing the spring extension and the rod in the bottom of the slot, the other leg of the rod extending from the slot by which the rod is adjusted along the bottom of the slot to change the bending moment of the spring extension, said body having an aperture in the area of the cutting end for receiving the chips cut thereby.

References Cited by the Examiner

UNITED STATES PATENTS

| 2,437,822 | 3/1948 | Jones | 77—73.5 |
| 2,657,597 | 11/1953 | Pickering et al. | 77—73.5 |
| 3,166,958 | 1/1965 | Cogsdill | 77—73.5 |

WILLIAM W. DYER, JR., *Primary Examiner.*

G. A. DOST, *Assistant Examiner.*